M. H. MADSEN.
CORN PLANTER DROPPER MECHANISM.
APPLICATION FILED OCT. 3, 1917.
1,272,828.
Patented July 16, 1918.
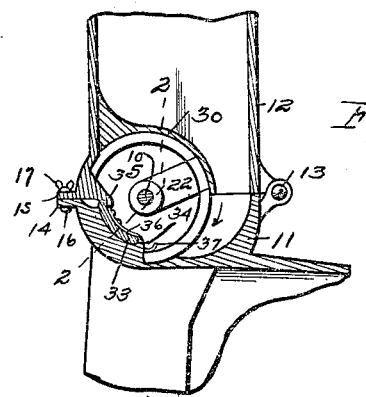
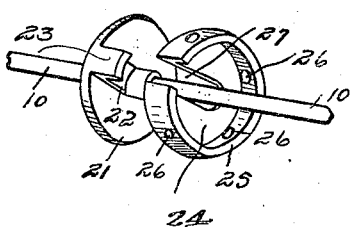
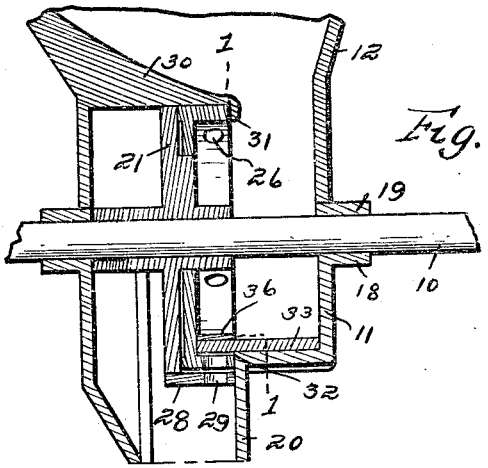
Inventor
Mads H. Madsen
By Owing & Bair Attys

UNITED STATES PATENT OFFICE.

MADS H. MADSEN, OF KIMBALLTON, IOWA.

CORN-PLANTER DROPPER MECHANISM.

1,272,828.    Specification of Letters Patent.    Patented July 16, 1918.

Application filed October 3, 1917. Serial No. 194,628.

*To all whom it may concern:*

Be it known that I, MADS H. MADSEN, a citizen of the United States, and resident of Kimballton, in the county of Audubon and State of Iowa, have invented a certain new and useful Corn-Planter Dropper Mechanism, of which the following is a specification.

The object of my invention is to provide a corn planter dropper mechanism of durable construction which is comparatively simple and inexpensive.

More particularly it is my object to provide such a mechanism including a dropper plate adapted to rotate in a vertical plane having a rim or band, provided with seed receiving openings, and having means for covering the upper part of the dropper plate for reducing the friction between the corn and the dropper plate, the whole being so constructed that the corn may drop into the plate from the side and thence into the holes from above.

Still a further object is to provide a suitable means for mounting said dropper plate in the box to permit its quick and easy removal for substituting another plate.

With these and other objects in view my invention consists in the construction, arrangement, and combination of the various parts of the device, whereby the objects contemplated are attained, as hereinafter more fully set forth, pointed out in my claims, and illustrated in the accompanying drawings, in which:

Figure 1 shows a vertical, sectional view through a seed corn box, and corn planter mechanism embodying my invention.

Fig. 2 shows a vertical, sectional view through the same mechanism, taken at right-angles to Fig. 1, taken on the line 2—2 of Fig. 1, and Fig. 3 shows a detail, perspective view of part of the mechanism.

This application covers matter divided from my application which matured into Patent #1,155,592.

It may be stated in a general way that my device has to do with the mechanism for selecting a certain number of grains of seed such, for instance, as corn from a box and dropping the same into the planter leg or boot.

In the accompanying drawings, I have shown only the parts of the mechanism having to do with this invention, but it will be understood that my device is designed to be used on a suitable machine such for instance, as that of a cornplanter.

In the accompanying drawings, I have used the reference numeral 10 to indicate generally a shaft which is ordinarily mounted transversely of the machine and is intermittently actuated by mechanism not here shown, and forming no part of my present invention, but which may be of the type shown in my patent above referred to for operating the seed selecting device herein shown.

The shaft 10 extends through a seed box having the lower portion 11 which in practice is mounted on the frame of the planter.

Hinged to the portion 11 is an upper portion 12. The portions 11 and 12 have on their sides opposite the hinge 13 flanges 14 and 15 which may be locked together in any suitable way as, for instance, by the bolt 16 and wing nut 17.

The parts 11 and 12 of the seed box are arranged with coacting bearing members 18 and 19 for the shaft 10.

Extending downwardly from the fixed portion 11 of the seed box is the planter leg or boot 20.

Mounted on the shaft 10 within the portion 11 of the seed box is a disk 21. On one face of the disk 21 is a rib 22 at the outer end of which is a laterally extending lug 23, clearly shown in Fig. 3.

The disk 21 is fixed on the shaft 10. For coacting with the disk 21 I have provided a dropper plate comprising a disk 24 having at its periphery a laterally extending annular band or ring 25, provided with a series of holes 26.

The band 25 and disk 24 are formed with an opening 27 to permit the disk to be slipped over the shaft 10 and moved to position against the disk 21 with the rib 22 and lug 23 received in the opening 27 for thereby locking the dropper plate against rotation with relation to the shaft 10.

It will thus be clear that when the parts are assembled, the dropper plate rotates with the shaft. The bottom member 28 of the seed box extends across the part of the upper portion of the planter leg 20 below the disk 21, and dropper plate, as shown in Fig. 2, and is provided with an opening 29 with which the holes 26 successively register when the mechanism is being operated.

The interior of the upper hinged portion 12 of the side box is provided with an overhanging cover plate 30 which covers and protects the upper portion of the disk 21 and dropper plate, and which has a downwardly extending flange 31 at its inner edge extending below the periphery of the dropper plate at its upper portion, as illustrated in Fig. 2, whereby the disk 21 and dropper plate are largely relieved from frictional engagement with the corn in the seed box and are protected from dust and dirt.

The bottom of the seed box is formed with a shoulder 32 resting adjacent to the lower part of the band 25, as shown in Fig. 2.

Resting upon the bottom of the seed box is a locking plate 33 having a portion which overlaps a part of the band 25, as shown in Fig. 2.

For securing the locking plate 33 in position, the following means have been provided.

The bottom of the seed box is provided with an engaging shoulder 34 abutting against the lower part of the locking plate 33 and the hinged portion of the seed box is provided with an overhanging locking member 35 adapted to receive the upper edge of the locking plate 33, so that when the parts are assembled the locking plate 33 is held properly in position by the shoulder 34, the locking member 35, the disk 24 and the wall of the seed box 11, as shown in Figs. 1 and 2.

Secured to the upper surface of the locking plate 33 is a spring 36 which has a curved end 37 projecting beyond the lower edge of the locking plate and resting upon the inner surface of the band 25 for a purpose hereinafter mentioned.

In the assembling and use of my improved corn planter mechanism, it will be understood that two of the devices herein shown are used in connection with one shaft 10 on the ordinary corn planter.

The dropper plates may be used with holes 26 of different sizes for selecting out a number of grains of corn, for instance, and it is desirable that the dropper plate should be readily and easily interchangeable, and hence that it be readily and easily removed from the machine.

In assembling the parts, the disks 21 are fixed on the shaft and the dropper plates are placed in position adjacent to the disks. The upper portions 12 of the seed boxes are tilted back and the shaft is placed in position.

The locking plates 33 are then inserted in position on the bottom of the seed box and the hinged portions 12 of the seed boxes are moved from positions shown in Figs. 1 and 2 and locked.

The device is then ready for use.

When the planter is in operation intermittent rotary motion is imparted to the shaft 10 by suitable mechanism such, for instance, as that shown in my patent referred to, thereby imparting intermittent rotary motion to the disk 21 and to the dropper plate.

It will be seen that the corn passes downwardly through the seed box and thence laterally into the dropper plate, and thence downwardly into the holes 26. As the dropper plate is rotated in the direction indicated by the arrow in Fig. 1, the holes 26 pass beneath the end 37 and the locking bolt 33.

The spring end 37 shoves off any grains of corn that might be partly in one of the holes and partly out, and prevents cutting the grain of corn.

When it is desired to change the dropper plate for one having different sized holes 26, the upper portion 12 of the seed box may be tilted back, whereupon the locking plate may be removed and the shaft may be rotated manually until the dropper plate is in position to be removed. Another dropper plate can be inserted, the locking bolts restored to their position and the seed box closed.

The advantages of my device may be largely seen from the foregoing description.

On account of the arrangement of the dropper plate in vertical position as here shown only a small amount of corn is agitated by the rotation of the dropper plate, and the dropper plate does not have to endure the friction of a heavy weight of corn.

The overhanging cover 30 protects the upper part of the dropper plate from the weight of the corn and also keeps out dust and dirt.

Some changes may be made in the construction and arrangement of the various parts of my improved corn planter dropper mechanism without departing from the essential features and purposes of my invention, and it is my intention to cover by my claims any such modified forms of structure or use of mechanical equivalents as may be reasonably included within their scope.

I claim as my invention:

1. In a device of the class described, a seed box, a shaft extended through said box, a member fixed on said shaft, a dropper plate adapted to be detachably mounted on said shaft, and coact with said member for locking the dropper plate against rotation with relation to the shaft, said dropper plate having an annular band provided with openings, said seed box having a hinged upper portion provided with a cover member for said dropper plate, whereby corn may drop downwardly in the seed box and enter said dropper plate from the side thereof, and then enter the holes in the dropper plate from above.

2. In a device of the class described, a shaft, a dropper plate mounted thereon having an annular band provided with holes, a seed box in which said dropper plate is received having a hinged upper portion, provided with a cover for said dropper plate, whereby corn is permitted to drop downwardly in the box and enter said dropper plate from the side and then enter said holes from above.

3. In a seed planter mechanism, a frame, a seed box thereon, having a hinged upper portion, a disk rotatably mounted in a vertical plane in said box, an annular band or flange on said disk having openings therein, a cover member for said band carried by the hinged portion of said box, the bottom of said box having a member adapted to engage one edge of said band, a locking plate adapted to rest on said last described member and to extend over said band, and coacting means on said member and said hinged portion of the box for securing said locking plate in position.

4. In a seed planter mechanism, a frame, a seed box thereon, having a hinged upper portion, a disk rotatably mounted in a vertical plane in said box, an annular band or flange formed on said disk having openings therein, a cover member for said band carried by the hinged portion of said box, the bottom of said box having a member adapted to engage one edge of said band, a locking plate adapted to rest on said last described member and to extend from said band, coacting means on said member and said hinged portion of the box for securing said locking plate in position, and a spring on said locking plate having a portion resting adjacent to said band.

5. In a device of the class described, a seed box, a shaft extended through said box, a member fixed on said shaft, a dropper plate adapted to be detachably mounted on said shaft, and to coact with said member for locking the dropper plate against rotation with relation to the shaft, said dropper plate having an annular band provided with openings, said seed box having a hinged upper portion provided with a cover member for said dropper plate, whereby corn may drop downwardly into the seed box and enter said dropper plate from the side thereof, and then enter the holes in the dropper plate from above, said box having an opening in its bottom designed in different positions of said band to register with an opening in said band, a shaft extended through said box, and coacting means on said shaft and said dropper plate, for locking the dropper plate against rotation with relation to the shaft.

MADS H. MADSEN.

Copies of this patent may be obtained for five cents each, by addressing the "Commissioner of Patents, Washington, D. C."